(12) United States Patent
Matsui et al.

(10) Patent No.: US 9,904,022 B2
(45) Date of Patent: Feb. 27, 2018

(54) OPTICAL RECEIVING DEVICE INCLUDING FIRST LENS AND SECOND LENS AND OPTICAL RECEIVING SYSTEM INCLUDING FIRST LENS AND SECOND LENS

(71) Applicant: FUJITSU LIMITED, Kawasaki-shi, Kanagawa (JP)

(72) Inventors: Jun Matsui, Kawasaki (JP); Tsuyoshi Yamamoto, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/346,781

(22) Filed: Nov. 9, 2016

(65) Prior Publication Data
US 2017/0160499 A1    Jun. 8, 2017

(30) Foreign Application Priority Data

Dec. 8, 2015    (JP) ................................. 2015-239617

(51) Int. Cl.
   *G02B 6/32*    (2006.01)
   *G02B 6/42*    (2006.01)
   *G02B 6/293*   (2006.01)

(52) U.S. Cl.
   CPC ....... *G02B 6/4215* (2013.01); *G02B 6/29361* (2013.01); *G02B 6/32* (2013.01); *G02B 6/4214* (2013.01)

(58) Field of Classification Search
   CPC .... G02B 6/4215; G02B 6/32; G02B 6/29361; G02B 6/4214
   See application file for complete search history.

(56) References Cited

U.S. PATENT DOCUMENTS

| 4,412,720 A * | 11/1983 | Costa ..................... G01M 11/31 385/11 |
| 5,048,030 A * | 9/1991 | Hiiro ..................... H01S 5/4025 359/347 |
| 6,549,285 B1 * | 4/2003 | Wright ................... G01B 11/06 356/497 |
| 6,552,799 B1 * | 4/2003 | Wright ............... G01B 11/0675 356/497 |
| 6,570,711 B2 * | 5/2003 | Ducellier ............. G02B 5/3083 356/495 |
| 6,965,479 B2 * | 11/2005 | Sano .................. G02B 6/29349 359/276 |

(Continued)

FOREIGN PATENT DOCUMENTS

| JP | 2004-325813 | 11/2004 |
| JP | 2006-119464 | 5/2006 |

*Primary Examiner* — Akm Enayet Ullah
(74) *Attorney, Agent, or Firm* — Fujitsu Patent Center (57) ABSTRACT

An optical receiving device includes: a lens portion configured to refract incident light with a first wavelength and refract incident light with a second wavelength; a first beam splitter configured to let refracted light with the first wavelength transmit and reflect refracted light with the second wavelength; a second beam splitter configured to reflect transmitted light with the first wavelength; and a light receiver configured to receive reflected light with the first wavelength and reflected light with the second wavelength, wherein the first beam splitter and the second beam splitter are disposed so as to be separated by a difference in optical path length between the light with the first wavelength and the light with the second wavelength.

14 Claims, 11 Drawing Sheets

(56) References Cited

U.S. PATENT DOCUMENTS

| | | | | |
|---|---|---|---|---|
| 8,434,873 B2* | 5/2013 | Feng | ................ | G03B 21/14 |
| | | | | 353/20 |
| 8,797,537 B2* | 8/2014 | Freischlad | ........... | G01B 11/306 |
| | | | | 356/450 |
| 2004/0051876 A1* | 3/2004 | Creasey | ................ | G01J 9/0246 |
| | | | | 356/450 |
| 2006/0181977 A1* | 8/2006 | Heor | ................ | G11B 7/1275 |
| | | | | 369/44.37 |
| 2007/0195659 A1* | 8/2007 | Yokota | ............... | G02B 27/1073 |
| | | | | 369/44.23 |
| 2010/0027026 A1* | 2/2010 | Miyata | ................ | G01B 9/0207 |
| | | | | 356/487 |
| 2010/0226655 A1* | 9/2010 | Kim | ................ | G02B 6/4246 |
| | | | | 398/139 |
| 2012/0151508 A1* | 6/2012 | Komma | ............... | G11B 7/1381 |
| | | | | 720/695 |
| 2015/0241632 A1* | 8/2015 | Chann | ................ | G02B 6/2706 |
| | | | | 385/27 |

* cited by examiner

OPTICAL RECEIVING DEVICE INCLUDING FIRST LENS AND SECOND LENS AND OPTICAL RECEIVING SYSTEM INCLUDING FIRST LENS AND SECOND LENS

CROSS-REFERENCE TO RELATED APPLICATION

This application is based upon and claims the benefit of priority of the prior Japanese Patent Application No. 2015-239617, filed on Dec. 8, 2015, the entire contents of which are incorporated herein by reference.

FIELD

The embodiments discussed herein are related to an optical receiving device and an optical receiving system.

BACKGROUND

With an increase in communication capacity, optical communication systems using optical signals have been widely used.

Examples of related art are disclosed in Japanese Laid-open Patent Publication Nos. 2006-119464 and 2004-325813.

SUMMARY

According to an aspect of the embodiments, an optical receiving device includes: a lens portion configured to refract incident light with a first wavelength and refract incident light with a second wavelength; a first beam splitter configured to let refracted light with the first wavelength transmit and reflect refracted light with the second wavelength; a second beam splitter configured to reflect transmitted light with the first wavelength; and a light receiver configured to receive reflected light with the first wavelength and reflected light with the second wavelength, wherein the first beam splitter and the second beam splitter are disposed so as to be separated by a difference in optical path length between the light with the first wavelength and the light with the second wavelength. The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, communication distances in optical communication for use in a data center or the like may be classified into the following two:

(1) a distance within several hundreds of meters inside a server rack or between adjacent server racks; and (2) a distance equal to or longer than several hundreds of meters between server racks on the same floor or between server racks across a building.

In the optical communication (1), a short-wavelength optical module is used, including a short-wavelength laser (for example, with a wavelength of 850 nm) and a photodetector which receives an optical signal generated by the laser. In the optical communication (2), a long-wavelength optical module is used, including a long-wavelength laser (for example, with a wavelength of 1310 nm, 1550 nm, or the like) and a photodetector which receives an optical signal generated by the laser. Thus, when a connection structure between servers is changed due to, for example, an improvement in performance or addition of a data center, switching is made between the short-wavelength optical module and the long-wavelength optical module so as to support each connection destination, for example, each connection distance.

For example, optical signals from the short-wavelength laser and the long-wavelength laser may be received by the same optical receiving module. For example, two photodetectors are disposed via a beam splitter which reflects light with a specific wavelength and lets light with another wavelength pass through. A beam splitter which reflects a laser beam with a long wavelength output from an optical fiber is placed. A photodetector capable of receiving light with a long wavelength is disposed via a lens to a destination of the laser beam which is reflected by the beam splitter. A photodetector capable of receiving light with a short wavelength is disposed via a lens to a destination of a laser beam with a wavelength other than the long wavelength which passes through the beam splitter.

In the above, while a short-wavelength optical module and a long-wavelength optical module may not be provided both, the number of components such as lenses and photodetectors is increased to make a module system large as a whole. Thus, it may be difficult to increase density for increasing transmission bands desired in optical communications for supporting a data center. The size of an electrical circuit such as a transimpedance amplifier (TIA) placed at a subsequent stage of the photodetector may be doubled or more.

For example, the optical receiving device is used for optical interconnection inside a server rack for use in a data center or the like (short-wavelength optical communication within several hundreds of meters or so) and between server racks (long-wavelength optical communication on the order of several hundreds of meters or longer).

Figure 1:
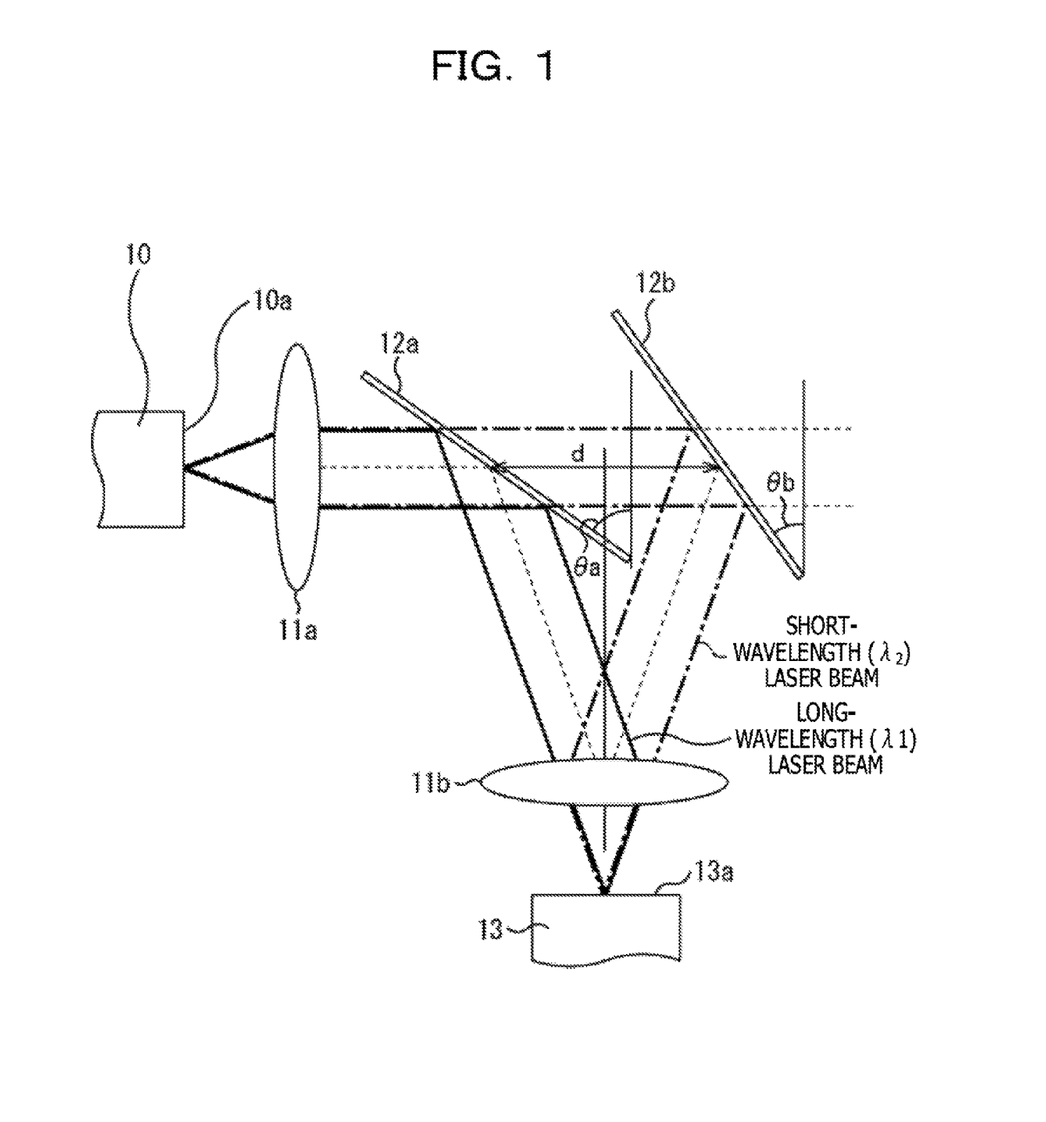
FIG. 1 depicts an example of an optical receiving device.

FIG. 1 depicts an example of the optical receiving device. The optical receiving device includes a lens unit, a plurality of reflecting units (here, of two types) which reflect each of laser beams of a plurality of light beams with different wavelengths (here, of two types), and a light receiving unit which receives each of the plurality of light beams. The lens unit has, for example, lenses 11a and 11b which each refract incident light. The reflecting units have, for example, beam splitters 12a and 12b. In place of the beam splitter 12b, a mirror which completely reflects incident light beams of all wavelengths may be used. The light receiving unit may be, for example, a photodetector (photodiode) 13.

The lens 11a is disposed at a subsequent stage of a light-emission surface 10a of an optical fiber 10, from which a laser beam transmitted from an optical transmitting device is output as an optical signal. The lens 11b is disposed at a previous stage of the photodetector 13.

Figure 2:
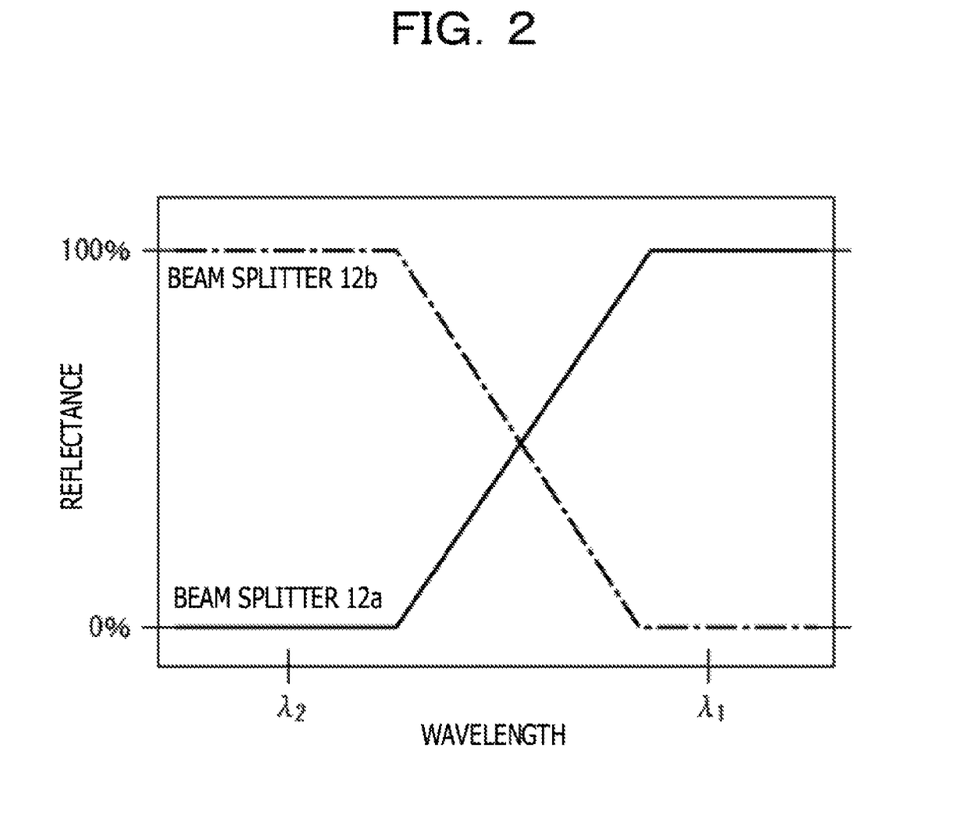
FIG. 2 depicts an example of reflection and transmission characteristics of beam splitters.

The beam splitters 12a and 12b each support a specific different wavelength. FIG. 2 depicts an example of reflection and transmission characteristics of the beam splitters. For example, as depicted in FIG. 2, the beam splitter 12a may have a characteristic of reflecting substantially 100% of light with a long wavelength $\lambda_1$ such as, for example, 1310 nm or 1550 nm, and letting substantially 100% of light with another wavelength (including light with a short wavelength $\lambda_2$ such as, for example, 850 nm) pass through (with a reflectance of substantially 0%). The beam splitter 12b may have a characteristic of reflecting substantially 100% of light with the short wavelength $\lambda_2$ and letting substantially 100% of light with another wavelength (including light with the long wavelength $\lambda_1$) pass through (with a reflectance of substantially 0%).

The beam splitters 12a and 12b are placed so as to be separated by a difference d in optical path length between the light with the long wavelength $\lambda_1$ and the light with the short wavelength $\lambda_2$, and have an inclination of θa and an inclination of θb, respectively, from a vertical direction. The difference d in optical path length may be uniquely determined from the focal lengths of the lenses 11a and 11b, a distance from the light-emission surface 10a of the optical fiber 10 to the lens 11a, a distance between the lenses 11a and 11b, and a distance from the lens 11b to a light-receiving surface 13a of the photodetector 13.

Figure 3:
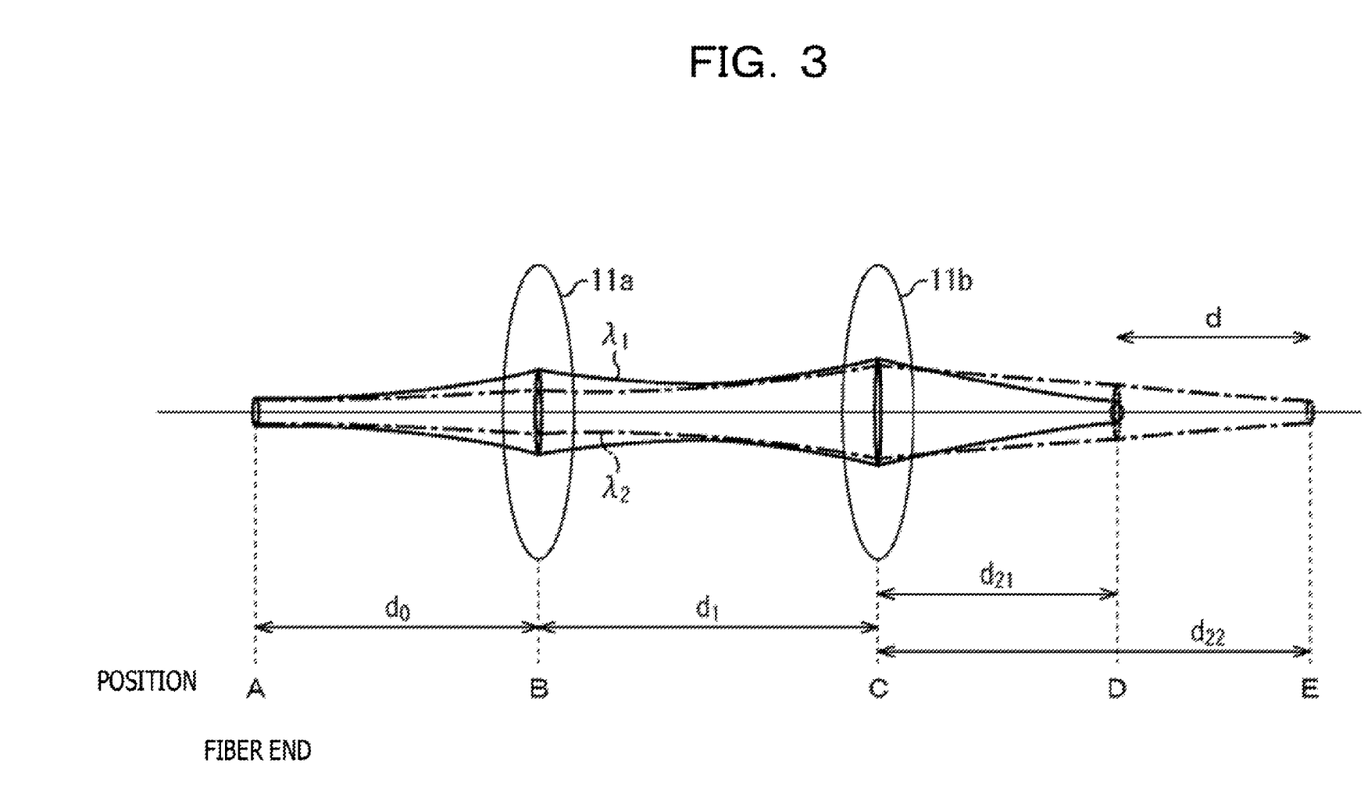
FIG. 3 depicts an example of laser wavelength dependence of a beam waist position of a laser beam gathered by a lens unit.

For example, the difference d in optical path length as an arrangement distance between the beam splitters 12a and 12b may be determined. FIG. 3 depicts an example of laser wavelength dependence of a beam waist position of a laser beam gathered at the lens. The beam waist position refers to a position on an optical axis where the beam spot size of a laser beam has a minimum value. FIG. 3 depicts a case in which the distance between the lenses 11a and 11b is fixed with respect to laser beams with different wavelengths $\lambda_1$ and $\lambda_2$. The light-emission surface 10a of the optical fiber 10 is at a position A, the lens 11a is at a position B, and the lens 11b is at a position C. A beam waist position of the laser beam with the wavelength $\lambda_1$ is at a position D separated from the position C by a distance $d_{21}$. A beam waist position of the laser beam with the wavelength $\lambda_2$ is at a position E separated from the position C by a distance $d_{22}$. The beam waist positions D and E are determined by the focal lengths of the lenses 11a and 11b, a distance $d_0$ from the position A to the position B, a distance $d_1$ from the position B to the position C, and the wavelengths $\lambda_1$ and $\lambda_2$. Thus, as depicted in FIG. 3, a different plane depending on the wavelength is at a beam waist position.

Figure 5:
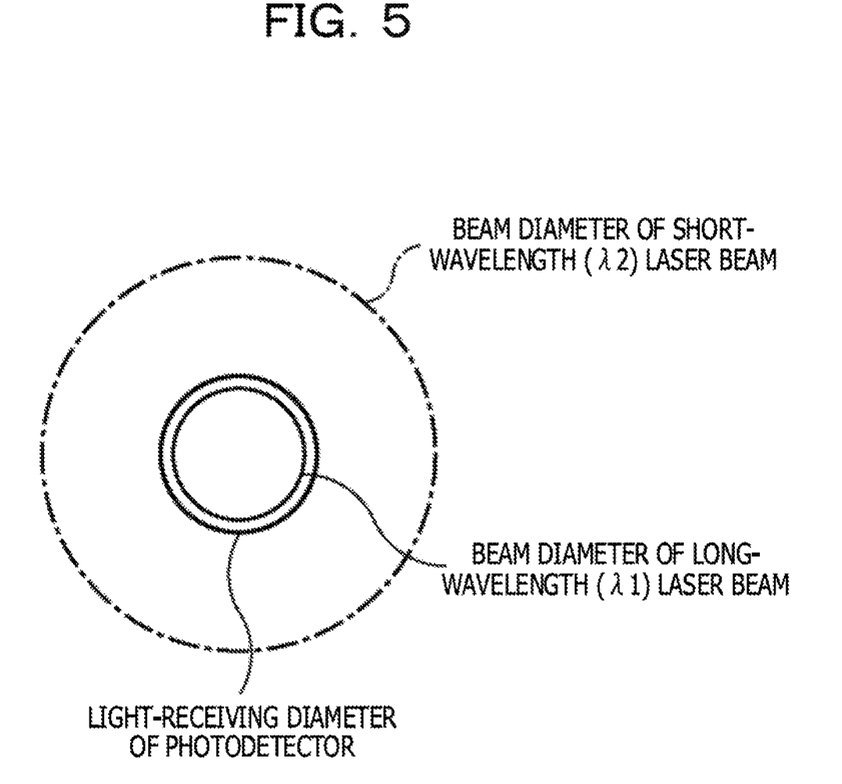
FIG. 5 is a schematic view depicting a comparison in spot diameter when a light receiving unit is disposed at a position D.

In FIG. 3, for example, the photodetector 13 is disposed at the position D, where the laser beams with the wavelengths $\lambda_1$ and $\lambda_2$ are each received. As depicted in FIG. 5, in the photodetector 13, the laser beam with the wavelength $\lambda_1$ is at its beam waist position, and the laser beam with the wavelength $\lambda_2$ has a beam diameter larger than the light-receiving surface of the photodetector 13. In this case, light-receiving efficiency of the laser beam with the wavelength $\lambda_2$ has a low value, for example, on the order of 16%. This value is on the order of ⅛ of the light-receiving efficiency of the laser beam with the wavelength $\lambda_1$.

Figure 4:
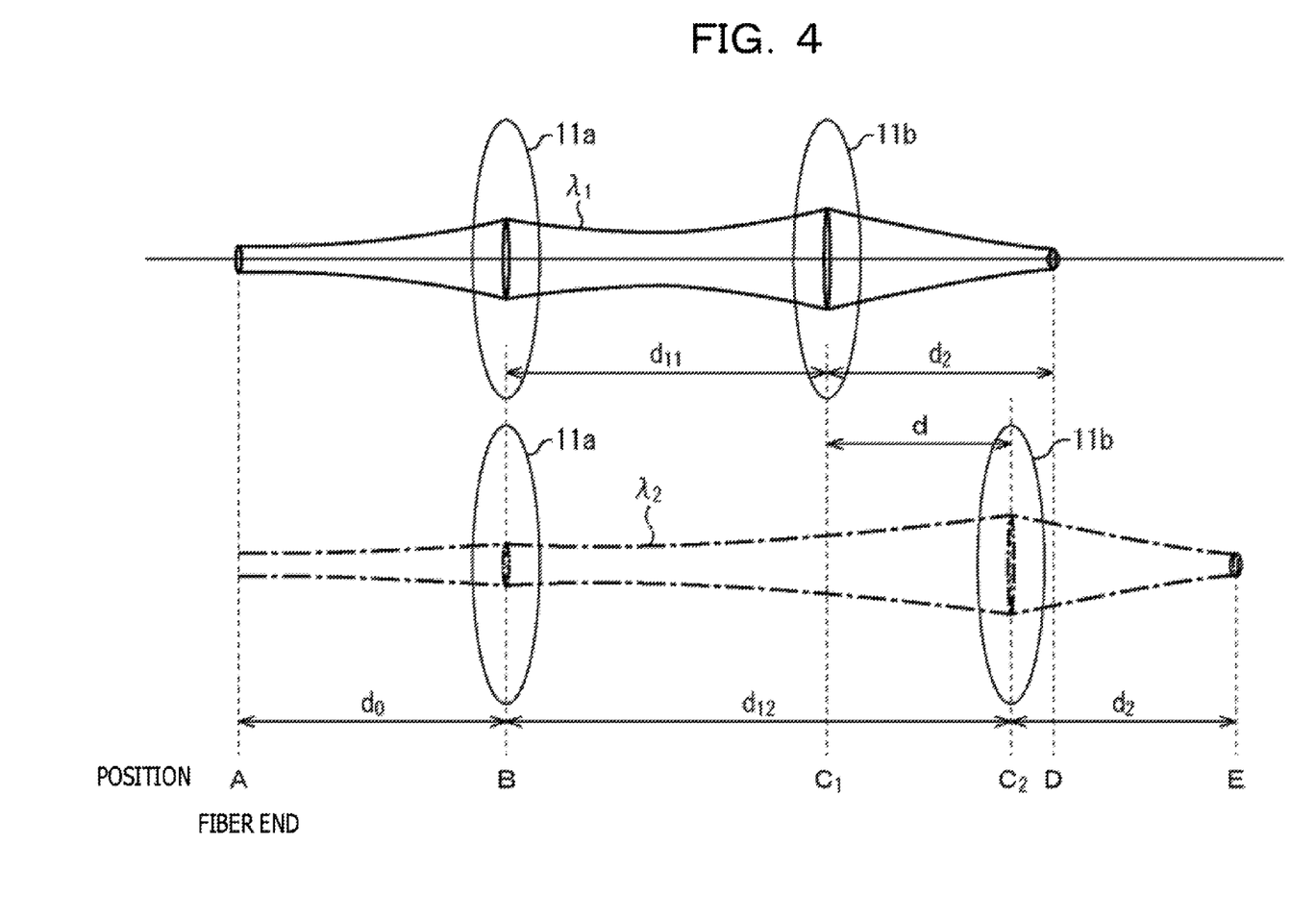
FIG. 4 depicts an example of laser wavelength dependence when a beam waist position with respect to a second lens is fixed.

FIG. 4 depicts an example of laser wavelength dependence when the beam waist position with respect to the lens is fixed. For the laser beam with the wavelength $\lambda_1$, the light-emission surface 10a of the optical fiber 10 is at the position A, the lens 11a is at the position B, and the lens 11b is at a position $C_1$. The position D, which is the beam waist position of the laser beam with the wavelength $\lambda_1$, is determined by the focal lengths of the lenses 11a and 11b, the distance $d_0$ from the position A to the position B, a distance $d_{11}$ from the position B to the position $C_1$, and the wavelength $\lambda_1$. For the laser beam with the wavelength $\lambda_2$, it is assumed that the light-emission surface 10a of the optical fiber 10 is at the position A, the lens 11a is at the position B, and the lens 11b is at a position $C_2$. The position E, which is the beam waist position of the laser beam with the wavelength $\lambda_2$, is determined by the focal lengths of the lenses 11a and 11b, the distance $d_0$ from the position A to the position B, a distance $d_{12}$ ($>d_{11}$) from the position B to the position $C_2$, and the wavelength $\lambda_2$. For example, when a distance from the lens 11b to the positions D and E of the light-receiving surface is fixed (distance $d_2$), a difference occurs in the distance between the lenses 11a and 11b, and this distance $d_{12}$-$d_{11}$ may correspond to the difference d in optical path length.

In FIG. 1, when a laser beam with the wavelength $\lambda_1$ is emitted from the light-emission surface 10a of the optical fiber 10, the laser beam is gathered at the lens 11a. The laser beam is then reflected at the beam splitter 12a, and is optically coupled to the photodetector 13 via the lens 11b. When a laser beam with the wavelength $\lambda_2$ is emitted from the light-emission surface 10a of the optical fiber 10, the laser beam is gathered at the lens 11a. The laser beam then passes through the beam splitter 12a without being reflected, is reflected at the beam splitter 12b, and is then optically coupled to the photodetector 13 via the lens 11b.

For example, the beam splitters 12a and 12b are disposed so as to be separated by the difference d in optical path length. With this, the difference in optical path length disappears between the laser beam with the wavelength $\lambda_1$ reflected at the beam splitter 12a and the laser beam with the wavelength $\lambda_2$ reflected at the beam splitter 12b. Thus, the laser beams with the wavelengths $\lambda_1$ and $\lambda_2$ have a common beam waist position on the same plane. The laser beams with different wavelengths have a common beam waist on the same plane. Thus, by matching the same plane and the light-receiving surface 13a of the photodetector 13, a structure may be generated in which all laser beams are received at the same beam waist position, and highly-efficient optical reception (substantially 100% for both of the laser beams with the wavelengths $\lambda_1$ and $\lambda_2$) may be performed.

Figure 6:
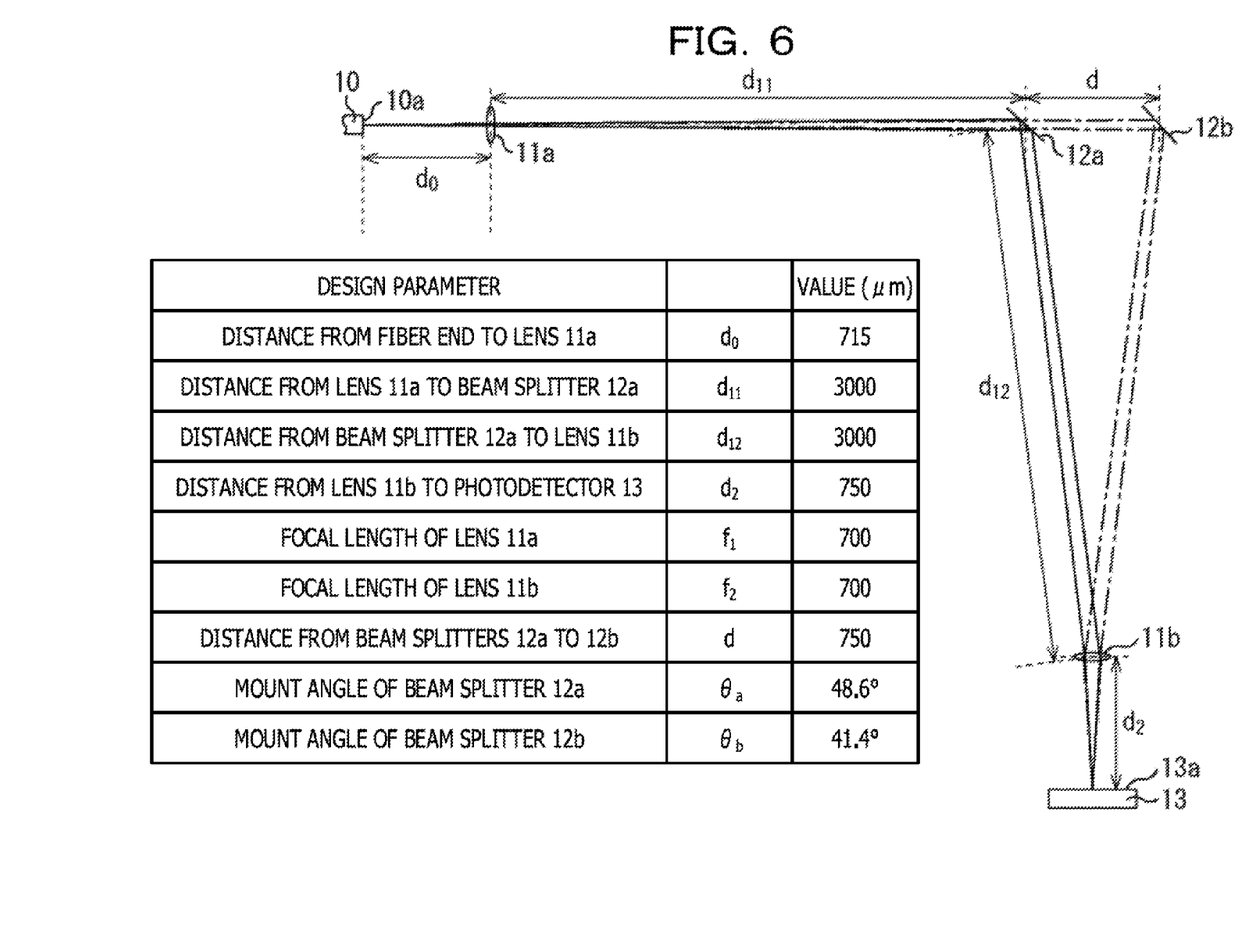
FIG. 6 depicts an example of the optical receiving device.

FIG. 6 depicts an example of the optical receiving device. In FIG. 6, the focal lengths of the lenses 11a and 11b and a positional relation among the light-emission surface 10a of the optical fiber 10, the lens 11a, the lens 11b, the beam splitter 12a, the beam splitter 12b, and the light-receiving surface 13a of the photodetector 13 are depicted. In this case, the wavelength $\lambda_1$ may be 1550 nm, and the wavelength $\lambda_2$ may be 850 nm.

In the above, without increasing the number of components of the optical receiving device, a plurality of light beams with different wavelengths may be received with high efficiency, and optical reception with high reliability may be performed.

Figure 7:
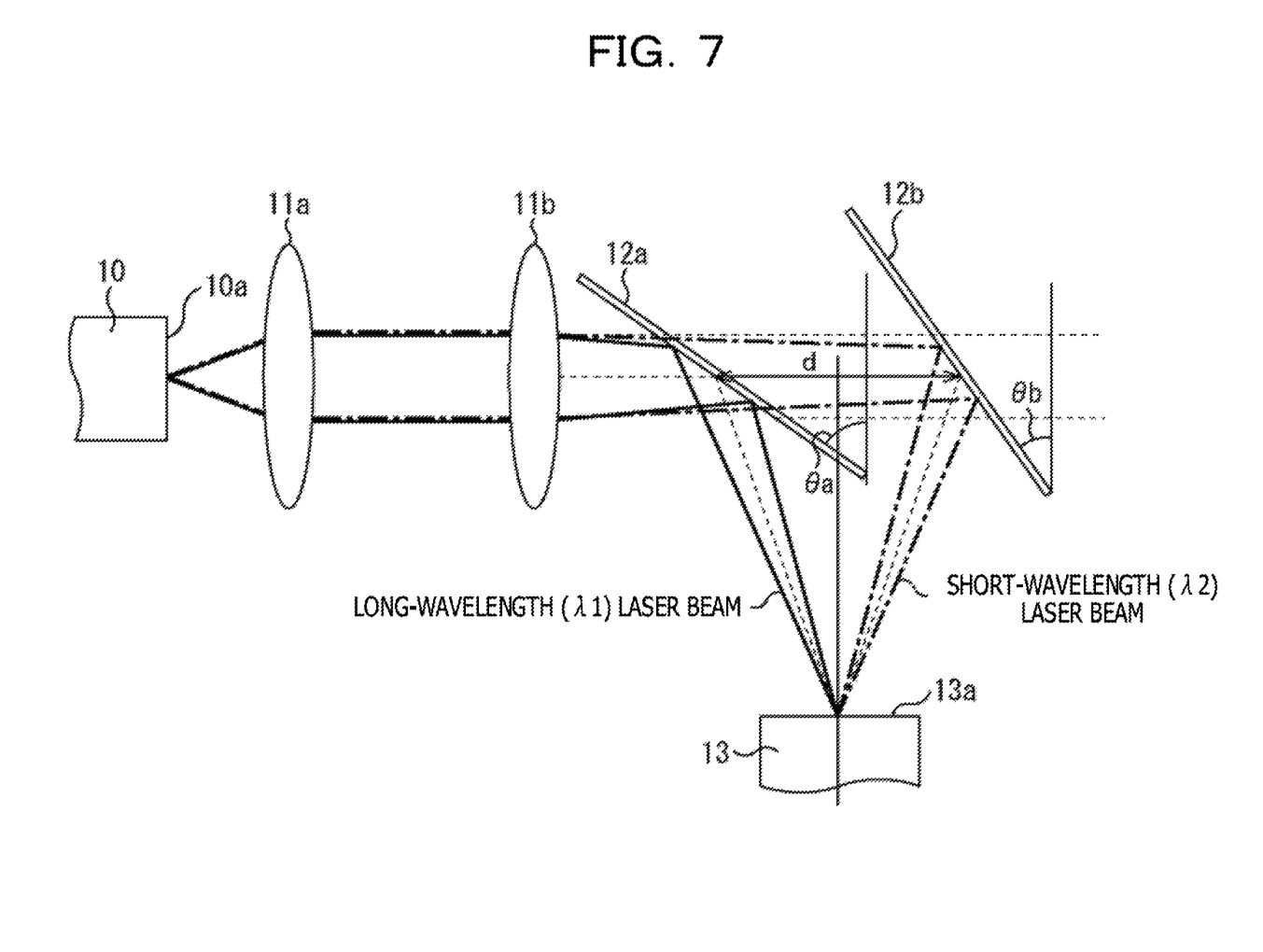
FIG. 7 depicts an example of the optical receiving device.

FIG. 7 depicts an example of the optical receiving device. In FIG. 7, an optical receiving device and an optical receiving method similar to those of FIG. 1 are disclosed, but an arrangement state of the components of the optical receiving device is different. In FIG. 7, a component similar to that depicted in FIG. 1 is provided with the same reference character, and its description may be omitted.

The optical receiving device includes a lens unit, a plurality of reflecting units (here, of two types) which reflect each laser beam of a plurality of light beams with different wavelengths (here, of two types), and a light receiving unit which receives each of the plurality of light beams. The lens unit has, for example, lenses 11a and 11b. The reflecting units have, for example, beam splitters 12a and 12b. In place of the beam splitter 12b, a mirror which completely reflects incident light beams of all wavelengths may be used. The light receiving unit may be, for example, a photodetector 13.

The lens 11a is disposed at a subsequent stage of a light-emission surface 10a of an optical fiber 10, from which a laser beam transmitted from an optical transmitting device is output as an optical signal. The lens 11b is disposed at a subsequent stage of the lens 11a.

The beam splitters 12a and 12b each support a specific different wavelength. For example, the beam splitters 12a and 12b are disposed at a subsequent stage of the lens 11b. For example, the beam splitters 12a and 12b are disposed between the lens 11b and the photodetector 13. The beam splitter 12a may have a characteristic of reflecting substantially 100% of light with a long wavelength $\lambda_1$ such as, for example, 1310 nm or 1550 nm, and letting substantially 100% of light with another wavelength (including light with a short wavelength $\lambda_2$ such as, for example, 850 nm) pass through (with a reflectance of substantially 0%). The beam splitter 12b may have a characteristic of reflecting substantially 100% of light with the short wavelength $\lambda_2$ and letting substantially 100% of light with another wavelength (including light with the long wavelength $\lambda_1$) pass through (with a reflectance of substantially 0%).

The beam splitters 12a and 12b are placed so as to be separated by a difference d in optical path length between the light with the long wavelength $\lambda_1$ and the light with the short wavelength $\lambda_2$, and have an inclination of θa and an inclination of θb, respectively, from a vertical direction. The difference d in optical path length may be uniquely determined from the focal lengths of the lenses 11a and 11b, a distance from the light-emission surface 10a of the optical fiber 10 to the lens 11a, a distance between the lenses 11a and 11b, and a distance from the lens 11b to a light-receiving surface 13a of the photodetector 13.

When a laser beam with the wavelength $\lambda_1$ is emitted from the light-emission surface 10a of the optical fiber 10, the laser beam is gathered at the lenses 11a and 11b. The laser beam is then reflected at the beam splitter 12a, and is optically coupled to the photodetector 13. When a laser beam with the wavelength $\lambda_2$ is emitted from the light-emission surface 10a of the optical fiber 10, the laser beam is gathered at the lenses 11a and 11b. The laser beam then passes through the beam splitter 12a without being reflected, is reflected at the beam splitter 12b, and is then optically coupled to the photodetector 13.

For example, the beam splitters 12a and 12b are disposed so as to be separated by the difference d in optical path length. The difference in optical path length disappears between the laser beam with the wavelength $\lambda_1$ reflected at the beam splitter 12a and the laser beam with the wavelength $\lambda_2$ reflected at the beam splitter 12b. Thus, the laser beams with the wavelengths $\lambda_1$ and $\lambda_2$ have a common beam waist position on the same plane. The laser beams with different wavelengths have a common beam waist on the same plane. Thus, by matching the same plane and the light-receiving surface 13a of the photodetector 13, a structure may be generated in which all laser beams are received at the same beam waist position, and highly-efficient optical reception (substantially 100% for both of the laser beams with the wavelengths $\lambda_1$ and $\lambda_2$) may be performed.

Figure 8:
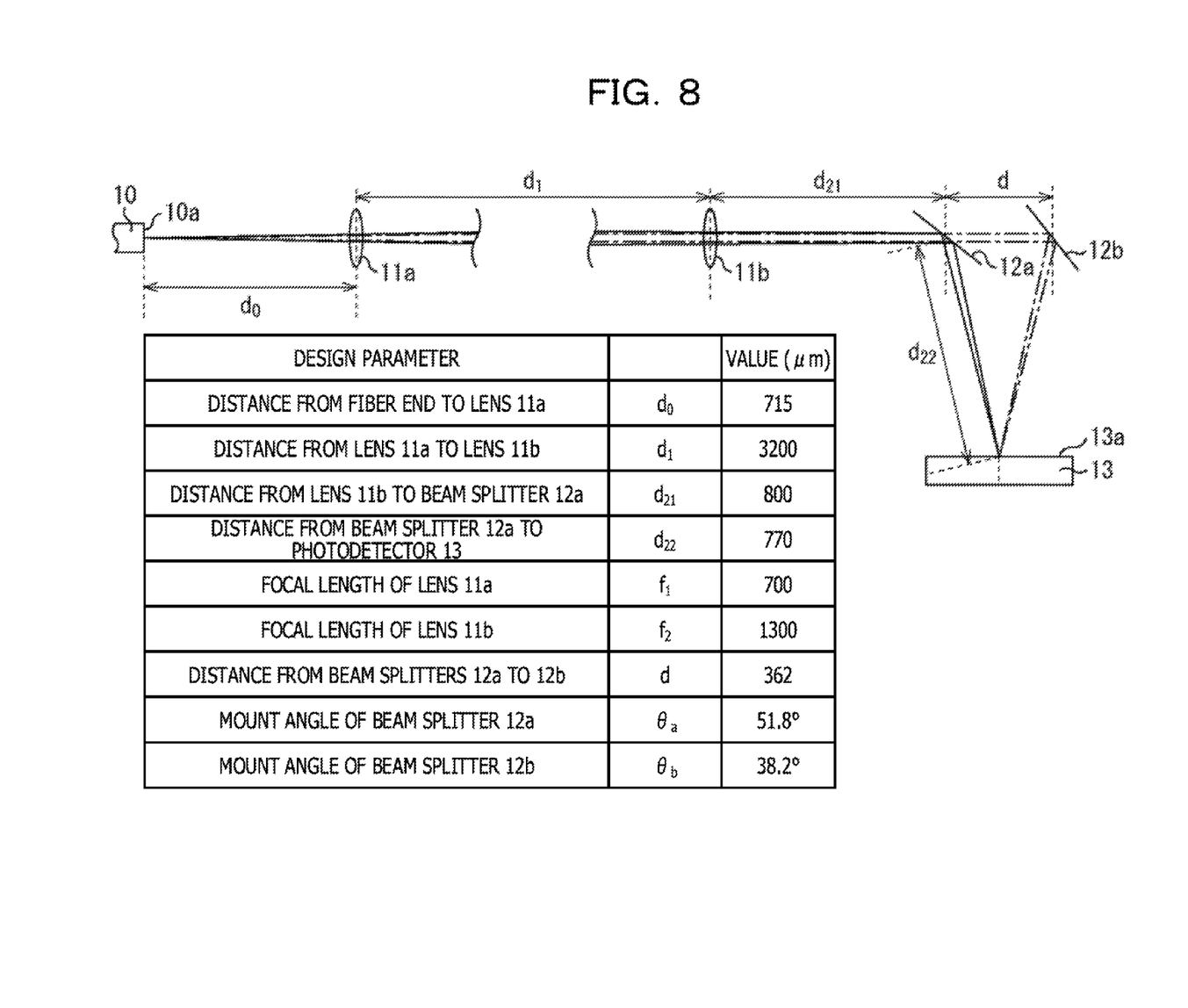
FIG. 8 depicts an example of the optical receiving device.

FIG. 8 depicts an example of the optical receiving device. In FIG. 8, the focal lengths of the lenses 11a and 11b and a positional relation among the light-emission surface 10a of the optical fiber 10, the lens 11a, the lens 11b, the beam splitter 12a, the beam splitter 12b, and the light-receiving surface 13a of the photodetector 13 are depicted. In this case, the wavelength $\lambda_1$ may be 1550 nm, and the wavelength $\lambda_2$ may be 850 nm.

For example, the beam splitters 12a and 12b may be disposed between the lens 11b and the photodetector 13, and the beam splitters 12a and 12b may be disposed at a previous stage of the lens 11a. For example, the beam splitters 12a and 12b may be disposed between the light-emission surface 10a of the optical fiber 10 and the lens 11a.

Without increasing the number of components of the optical receiving device, a plurality of light beams with different wavelengths may be received with high efficiency, and optical reception with high reliability may be performed.

Figure 9:
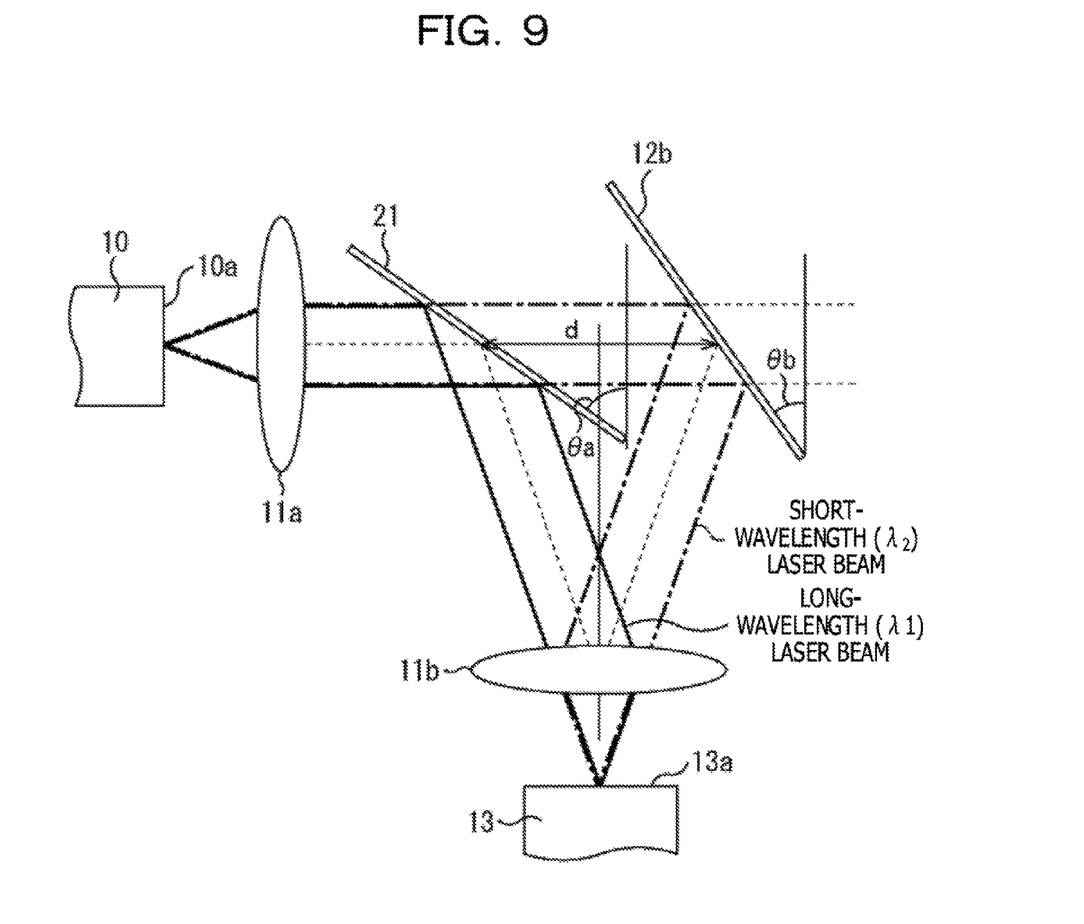
FIG. 9 depicts an example of the optical receiving device.

FIG. 9 depicts an example of the optical receiving device. In FIG. 9, an optical receiving device and an optical receiving method similar to those of FIG. 1 are disclosed, but FIG. 9 is different from FIG. 1 in that a beam splitter as a component of the optical receiving device is different. In FIG. 9, a component similar to that depicted in FIG. 1 is provided with the same reference character, and its description may be omitted.

The optical receiving device depicted in FIG. 9 includes a lens unit, a plurality of reflecting units (here, of two types) which reflect each laser beam of a plurality of light beams with different wavelengths (here, of two types), and a light receiving unit which receives each of the plurality of light beams. The lens unit has, for example, lenses 11a and 11b. The reflecting units have, for example, beam splitters 21 and 12b. In place of the beam splitter 12b, a mirror which completely reflects incident light beams of all wavelengths may be used. The light receiving unit may be, for example, a photodetector 13.

The beam splitters 21 and 12b each support a specific different wavelength. The beam splitter 21 has a characteristic of reflecting light with a long wavelength $\lambda_1$ such as, for example, 1310 nm or 1550 nm, with a reflectance lower than 100% (for example, on the order of 80%) and letting substantially 100% of light with another wavelength (including light with a short wavelength $\lambda_2$ such as, for example, 850 nm) pass through (with a reflectance of substantially 0%). The beam splitter 12b has a characteristic of reflecting substantially 100% of light with the short wavelength $\lambda_2$ and letting substantially 100% of light with another wavelength (including light with the long wavelength $\lambda_1$) pass through (with a reflectance of substantially 0%).

Figure 10:
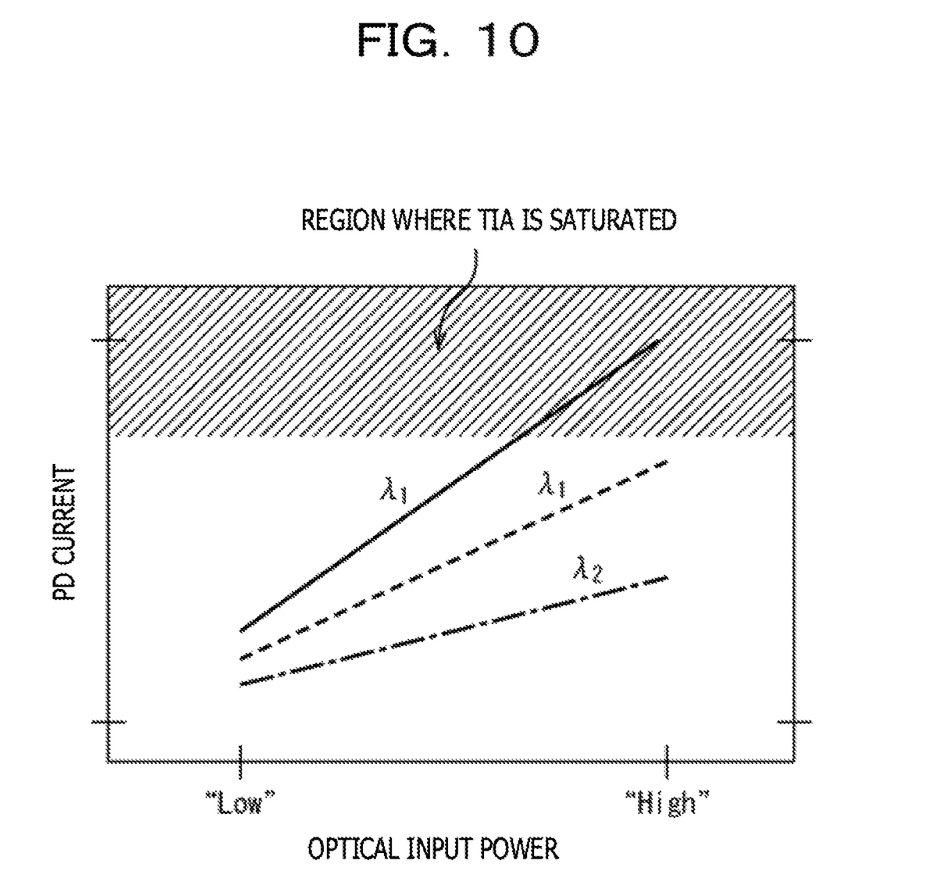
FIG. 10 depicts an example of a relation between optical input power and PD current.

FIG. 10 depicts an example of a relation between optical input power and PD current. The photodetector has different sensitivities depending on the wavelength of light. Thus, as depicted in FIG. 10, even if optical signals with same power are received, a current output from the photodetector differs depending on the wavelength. For example, a TIA for amplifying an electrical signal is placed at a subsequent stage of the photodetector, and the TIA may have a region called a saturated region, where amplification is not performed on more than or equal to a certain value. For example, a high-sensitivity TIA is placed for supporting a laser beam with the short wavelength $\lambda_2$ and, when an optical signal with the wavelength $\lambda_1$ is received, as indicated by a solid line in FIG. 10, a current (PD current) from the photodetector may exceed an input range of the TIA to reach the saturated region.

Figure 11:
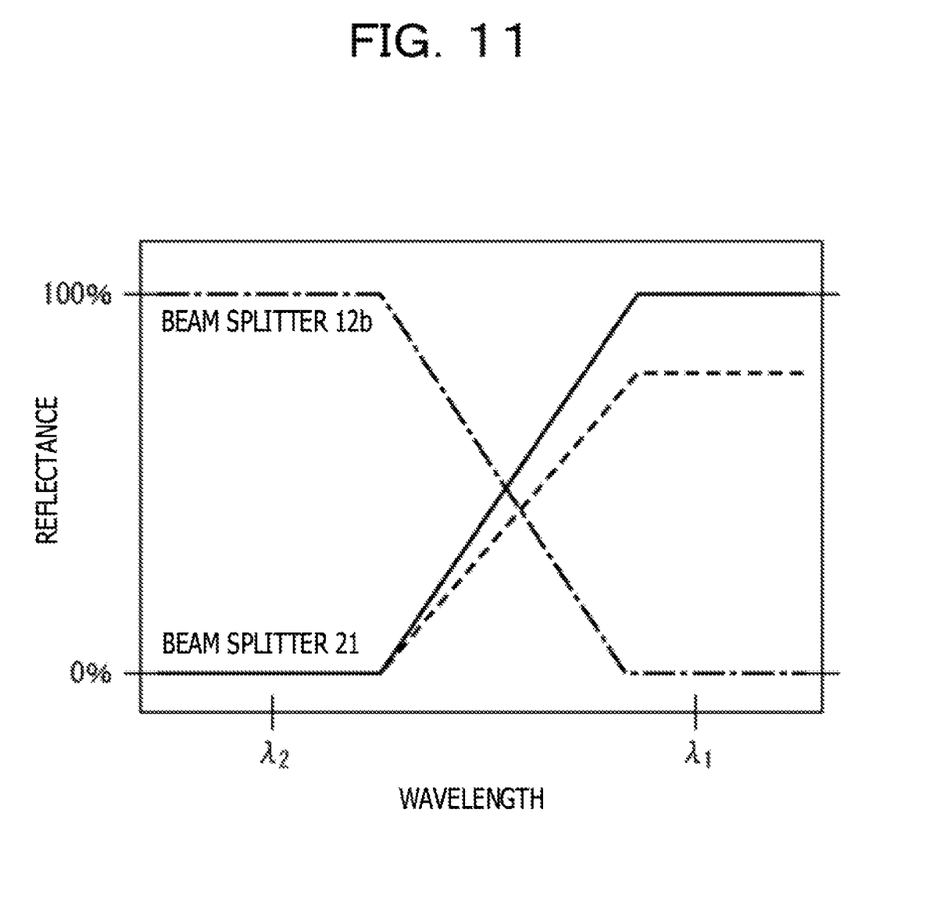
FIG. 11 depicts an example of reflection and transmission characteristics of beam splitters.

For example, in view of the presence of the above-described saturated region, for at least a reflecting unit which supports light with the longest wavelength, for example, the beam splitter 21 which supports light with the long wavelength $\lambda_1$, from among the plurality of reflecting units, the reflectance of light with the long wavelength $\lambda_1$ is adjusted. FIG. 11 depicts an example of reflection and transmission characteristics of the beam splitters. For example, as indicated by a broken line of FIG. 11, the transmission and reflection characteristic of the beam splitter 21 which supports light with long wavelength $\lambda_1$ is adjusted so that the PD current is in a normal operation range of the TIA. For example, light with the long wavelength $\lambda_1$ is reflected with a reflectance lower than 100% (for example, on the order of 80%), and substantially 100% of light with another wavelength is let pass through. Thus, the power of the incident laser beam entering the photodetector 13 is reduced so as not to reach the saturated region of the TIA as indicated by a broken line in FIG. 10, and substantially similar reception characteristics may be obtained for both of the laser beams with the long wavelength $\lambda_1$ and the short wavelength $\lambda_2$.

Also in FIG. 9, as with FIG. 8, the beam splitters 21 and 12b may be disposed between the lens 11b and the photodetector 13. The beam splitters 21 and 12b may be disposed between the light-emission surface 10a of the optical fiber 10 and the lens 11a.

In the beam splitter which supports light with the long wavelength $\lambda_1$, the reflectance of the light with the long wavelength $\lambda_1$ is adjusted. However, this is not meant to be restrictive. In the beam splitter which supports light with the short wavelength $\lambda_2$, the reflectance of the light with the short wavelength $\lambda_2$ may be adjusted. In this case, in the beam splitter which supports light with the short wavelength $\lambda_2$, the reflectance for the short wavelength $\lambda_2$ may be adjusted to be lower than 100%, for example, on the order of 80%. In both of the beam splitter which supports light with the long wavelength $\lambda_1$ and the beam splitter which supports light with the short wavelength $\lambda_2$, the reflectance of the light with the long wavelength $\lambda_1$ and the reflectance of the light with the short wavelength $\lambda_2$ may be adjusted. In this case, in both of these two beam splitters, the reflectance of the light with the long wavelength $\lambda_1$ and the reflectance of the light with the short wavelength $\lambda_2$ each may be adjusted to be lower than 100%, for example, on the order of 80%.

In the above-described optical receiving device, since a plurality of light beams with different wavelengths are received with high efficiency without increasing the number of components of the optical receiving device, optical reception with high reliability may be performed.

The optical receiving device may support light beams of two types with different wavelengths (long wavelength $\lambda_1$ and short wavelength $\lambda_2$), and this is not meant to be restrictive. The optical receiving device may support light beams of three types or more with different wavelengths. In this case, a plurality of reflecting units (beam splitters) which reflect a plurality of light beams are disposed so as to be separated by a difference in optical path length among the plurality of light beams. One light receiving unit (photodetector) may be provided, which receives each of the plurality of light beams. For example, for an optical receiving device which supports light beams of three types with different wavelengths, three reflecting units (beam splitters) which reflect light beams of three types are disposed so as to be separated by a difference in optical path length among the light beams of three types. For example, a first beam splitter and a second beam splitter may be disposed so as to be separated by a difference in optical path length between a first light beam with the shortest wavelength and a second light beam with an intermediate wavelength. The second beam splitter and a third beam splitter may be disposed so as to be separated by a difference in optical path length between the second light beam with the intermediate wavelength and a third light beam with the longest wavelength.

The above-described optical receiving device may support both of communication for a relatively short distance, for example, inside a server rack or between adjacent server racks, and communication for a relatively long distance, for example, between server racks on the same floor or between server racks across a building. In the optical receiving device, both of shortwave and longwave light beams are received. Therefore, for example, the optical receiving device may not be switched based on shortwave or longwave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiving device comprising:
   a lens portion configured to refract incident light with a first wavelength and refract incident light with a second wavelength and including a first lens and a second lens;
   a first beam splitter configured to let refracted light with the first wavelength transmit and reflect refracted light with the second wavelength;
   a second beam splitter configured to reflect transmitted light with the first wavelength; and
   a light receiver configured to receive reflected light with the first wavelength and reflected light with the second wavelength,
   the first beam splitter and the second beam splitter are disposed so as to be separated by a difference in optical path length between a first distance between the first lens and the second lens for the light with the first wavelength when a beam waist position of a laser beam gathered by the second lens is fixed and a second distance between the first lens and the second lens for the light with the second wavelength when the beam waist position of the laser beam gathered by the second lens is fixed.

2. The optical receiving device according to claim 1, wherein the first beam splitter and the second beam splitter are disposed between the first lens and the second lens.

3. The optical receiving device according to claim 1, wherein the first beam splitter and the second beam splitter are disposed between the lens portion and the light receiver.

4. The optical receiving device according to claim 1, wherein the first beam splitter and the second beam splitter are disposed at a subsequent stage of the lens portion.

5. The optical receiving device according to claim 1, wherein the first beam splitter is adjusted so as to have a reflectance value of the light with the second wavelength lower than 100%.

6. The optical receiving device according to claim 1, wherein the second beam splitter is adjusted so as to have a reflectance value of the light with the first wavelength lower than 100%.

7. An optical receiving system comprising:
an optical fiber configured to transmit light from an optical transmitting device; and
an optical receiving device configured to receive the light from the optical fiber,
the optical receiving device includes:
    a lens portion configured to refract first light with a first wavelength of the light and refract incident second light with a second wavelength of the light and including a first lens and a second lens;
    a first beam splitter configured to let refracted first light transmit and reflect refracted second light;
    a second beam splitter configured to reflect transmitted first light; and
    a light receiver configured to receive reflected first light and reflected second light,
    the first beam splitter and the second beam splitter are disposed so as to be separated by a difference in optical path length between a first distance between the first lens and the second lens for the first light when a beam waist position of a laser beam gathered by the second lens is fixed and a second distance between the first lens and the second lens for the second light when the beam waist position of the laser beam gathered by the second lens is fixed.

8. The optical receiving system according to claim 7, wherein the first beam splitter and the second beam splitter are disposed between the first lens and the second lens.

9. The optical receiving system according to claim 7, wherein the first beam splitter and the second beam splitter are disposed between the lens portion and the light receiver.

10. The optical receiving system according to claim 7, wherein the first beam splitter and the second beam splitter are disposed at a subsequent stage of the lens portion.

11. The optical receiving system according to claim 7, wherein the first beam splitter is adjusted so as to have a reflectance value of the light with the second wavelength lower than 100%.

12. The optical receiving system according to claim 7, wherein the second beam splitter is adjusted so as to have a reflectance value of the light with the first wavelength lower than 100%.

13. The optical receiving device according to claim 1, wherein the first beam splitter is provided with a first acute angle more than zero with respect to a vertical direction along a surface of the first lens, the second beam splitter is provided with a second acute angle more than zero with respect to the vertical direction along the first lens and the first acute angle and the second acute angle are different with each other.

14. The optical receiving system according to claim 7, wherein the first beam splitter is provided with a first acute angle more than zero with respect to a vertical direction along a surface of the first lens, the second beam splitter is provided with a second acute angle more than zero with respect to the vertical direction along the first lens and the first acute angle and the second acute angle are different with each other.

* * * * *